(12) United States Patent
Sasa et al.

(10) Patent No.: US 8,804,311 B2
(45) Date of Patent: Aug. 12, 2014

(54) ELECTROLYTE SOLUTION AND ELECTRIC ENERGY STORING DEVICE USING ELECTROLYTE SOLUTION

(75) Inventors: Masaaki Sasa, Kawasaki (JP); Tamotsu Yamamoto, Kawasaki (JP); Tsutomu Tanaka, Kawasaki (JP); Kensuke Yoshida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 146 days.

(21) Appl. No.: 13/616,387

(22) Filed: Sep. 14, 2012

(65) Prior Publication Data

US 2013/0003259 A1  Jan. 3, 2013

Related U.S. Application Data

(63) Continuation of application No. PCT/JP2010/057235, filed on Apr. 23, 2010.

(51) Int. Cl.
*H01G 9/035* (2006.01)
*H01G 9/022* (2006.01)
*H01G 9/042* (2006.01)
*H01G 9/00* (2006.01)

(52) U.S. Cl.
CPC ............. *H01G 9/035* (2013.01); *H01G 9/038* (2013.01); *H01G 9/042* (2013.01); *H01G 9/155* (2013.01)
USPC ........... 361/504; 361/503; 361/509; 361/519; 361/523; 361/528

(58) Field of Classification Search
CPC ....... H01G 9/035; H01G 9/038; H01G 9/042; H01G 9/155

USPC ........ 361/504, 502–503, 509, 512, 517–519, 361/523–525, 528–529
See application file for complete search history.

(56) References Cited

U.S. PATENT DOCUMENTS

| | | | |
|---|---|---|---|
| 6,288,888 B1 * | 9/2001 | Sakata et al. | 361/502 |
| 7,154,737 B2 * | 12/2006 | Maruo et al. | 361/502 |
| 7,233,481 B2 * | 6/2007 | Fujino | 361/502 |
| 7,347,954 B2 * | 3/2008 | Banno et al. | 252/62.2 |
| 7,471,502 B2 * | 12/2008 | Sato et al. | 361/502 |
| 8,081,418 B2 * | 12/2011 | Brandon et al. | 361/523 |
| 8,273,263 B2 * | 9/2012 | Kubo et al. | 252/62.2 |
| 2004/0094741 A1 | 5/2004 | Sato | |
| 2006/0120021 A1 | 6/2006 | Banno | |

FOREIGN PATENT DOCUMENTS

| | | |
|---|---|---|
| JP | 2001-23695 | 1/2001 |
| JP | 2002-93665 A1 | 3/2002 |
| JP | 2002-151360 A1 | 5/2002 |
| JP | 2007-227940 A1 | 9/2007 |
| WO | WO 2004/027789 A1 | 4/2004 |

OTHER PUBLICATIONS

International Search Report for International Application No. PCT/JP2010/057235 dated Jul. 13, 2010.

* cited by examiner

*Primary Examiner* — Nguyen T Ha
(74) *Attorney, Agent, or Firm* — Kratz, Quintos & Hanson, LLP

(57) ABSTRACT

To provide an electrolyte solution, which contains an electrolyte compound, a molecular structure of which contains a molecular chain containing a repeating unit of alkylene oxide, and contains quaternary ammonium cations at both terminals of the molecular chain.

20 Claims, 1 Drawing Sheet

ELECTROLYTE SOLUTION AND ELECTRIC ENERGY STORING DEVICE USING ELECTROLYTE SOLUTION

CROSS-REFERENCE TO RELATED APPLICATIONS

This application is a continuation application of International Application PCT/JP2010/057235 filed on Apr. 23, 2010 and designated the U.S., the entire contents of which are incorporated herein by reference.

FIELD

The embodiments discussed herein relate to an electrolyte solution, and an electric energy storing device using the electrolyte solution.

BACKGROUND

An electrochemical capacitor (electric double-layer capacitor) is a promising electric energy storing device, which allows frequent charging and discharging, because unlike secondary batteries that store electric energy by a chemical reaction induced at an electrode, the electrochemical capacitor stores electric energy by storing charge with ionic molecules. Therefore, the electrochemical capacitor will have less deterioration caused by charging and discharging, with only a small degree of deterioration of an electrode and deterioration of ionic molecules of the electrolyte at around withstand voltage. Accordingly, the electrochemical capacitor can allow about a few millions cycles of charging and discharging.

The electrochemical capacitor however has low withstand voltage, and the maximum chargeable voltage of approximately 3V, and therefore it is connected series when the charging voltage is high. When the parallel connection and series connection of the electrochemical capacitor are repeated during a cycle of charging and discharging, a chargeable capacity of the electrochemical capacitor reduces.

Accordingly, there is a need for improving energy density, rapid charging and discharging properties, and durability of an electrochemical capacitor.

In the electrochemical capacitor, an electrolyte acts as a carrier of charge in an electrolyte solution. Depending on a type of an electrolyte used, internal resistance and electrostatic capacitance of the capacitor vary. Generally, internal resistance of a capacitor can be reduced by incorporating polyvalent cations in a molecular of an electrolyte. Moreover, a small molecular weight of the electrolyte is economically advantageous as the production thereof is easy, but such electrolyte of small molecular weight has low ability for preventing solidification with low temperature of the electrolyte solution, and may be evaporated when used over a long period.

In order to reduce internal resistance of a capacitor, and solve the problem associated with a small molecular weight of an electrolyte, there is proposed an electrolyte having quaternary ammonium cations at both terminals of a polymer chain.

As for the electrolyte having quaternary ammonium cations at terminals of a polymer chain, there have been discussed an electrolyte having quaternary ammonium cations in the back bone, as well as the terminals of the polymer chain (see, for example, Japanese Patent Application Laid-Open (JP-A) No. 2002-151360), and an electrolyte whose polymer chain is an alkyl chain (see, for example, JP-A No. 2002-93665).

The electrolyte having quaternary ammonium cations in the back bone as well as the terminals of the polymer chain tends to cause decomposition by hydrolysis upon application of high voltage, and therefore there are problems that voltage to be applied is limited, and that the production cost thereof is high, as the synthesis thereof include many stages of chemical reactions.

The electrolyte a molecular chain of which is an alkyl chain has a problem that it has poor solubility and cannot increase a concentration thereof in a solution, which reduces internal resistance of a capacitor.

SUMMARY

The disclosed electrolyte solution contains an electrolyte compound a molecular structure of which contains a molecular chain containing a repeating unit of alkylene oxide, and contains quaternary ammonium cations at both terminals of the molecular chain.

The disclosed electric energy storing device contains the disclosed electrolyte solution.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS (Electrolyte Solution)

Figure 1:
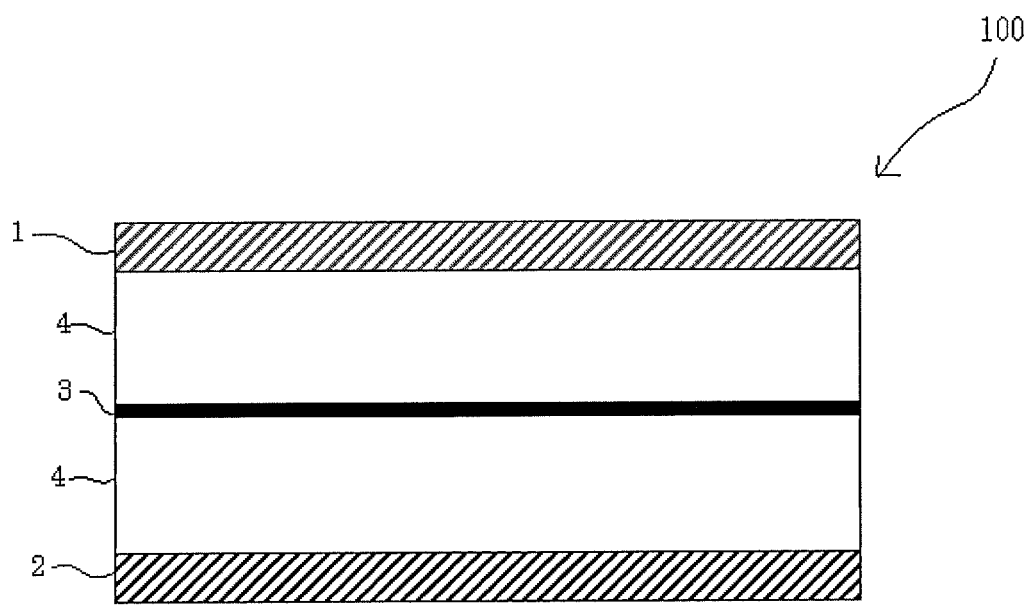
FIG. 1 is a diagram illustrating one example of an internal structure of the disclosed electric energy storing device.

The disclosed electrolyte solution contains at least an electrolyte compound, and may further contain an organic solvent, and other components, if necessary.

<Electrolyte Compound>

The electrolyte compound has a molecular structure which contains a molecular chain containing a repeating unit of alkylene oxide, and contains quaternary ammonium cations at both terminals of the molecular chain, and may further contain counter anions, and other components, if necessary.

—Alkylene Oxide—

The alkylene oxide is appropriately selected depending on the intended purpose without any limitation, and examples thereof include methylene oxide, ethylene oxide, and propylene oxide.

Among them, ethylene oxide is preferable in view of its solubility to a solvent in the electrolyte solution.

Considering solubility of alkylene oxide, it is assumed that methylene oxide having a high proportion of ether bonds in a molecular chain thereof has excellent solubility, but methylene oxide is a unstable substance, which is easily hydrolyzed as a chemical structure thereof is represented by a chemical structural formula: —COCOCOCO—, in which oxygens are present at both sides of carbon. On the other hand, the chemical structural formula of the propylene oxide is: —CCCOC-CCOCCCOCCCO—, and the propylene oxide is stable molecule, but a proportion of oxygen atoms in the molecular chain is lower than that of the ethylene oxide.

Accordingly, the ethylene oxide is the most efficient molecular structure which contains ether bonds in the molecular chain thereof.

As a result of having the repeating unit of the alkylene oxide in the electrolyte compound, solubility thereof to a solvent of the electrolyte solution can be improved.

The number of the repeating units of the alkylene oxide is appropriately selected depending on the intended purpose without any limitation, but the number thereof is preferably 1 to 10, more preferably 1 to 8, and even more preferably 1 to 3.

As the larger the number of the repeating units is, less influence of the quaternary ammonium cation to the molecular weight there is. On the other hand, the smaller the number of the repeating units is, more influence of the quaternary ammonium cation to the molecular weight there is.

When the number of the repeating units is greater than 10, the properties obtained are close to that of the polyethylene glycol chain, even though quaternary ammonium cations are incorporated at the both terminals, which is not suitable as an electrolyte. Moreover, a device using the resulting electrolyte solution may not maintain the internal resistance and the electrostatic capacitance within the preferable ranges after a load test. When the number of the repeating units in within the aforementioned even more preferable range, it is advantages in view of internal resistance and electrostatic capacitance after the load test.

—Quaternary Ammonium Cation—

The quaternary ammonium cation is appropriately selected depending on the intended purpose without any limitation, as long as the quaternary ammonium cations are formed only at the both terminals of the molecular chain.

Among them, trimethyl ammonium cation is preferable, because trimethyl ammonium cation is easier to synthesize compare to other quaternary ammonium cations, and has a high proportion of the quaternary ammonium cation in the molecular chain, which is suitable for the electrolyte.

As there are the quaternary ammonium cations at both terminals of the molecular chain, the specific conductance of the electrolyte solution can be improved, in turn, improving the capacity of the capacitor.

—Counter Anion—

The counter anion is appropriately selected depending on the intended purpose without any limitation, and examples thereof include halogen anion (e.g., $F^-$, $Cl^-$, $Br^-$, $BF_4^-$, $PF_6^-$, $ClO_4^-$, $AsF_6^-$, $SbF_6^-$, $AlCl_4^-$, and Rf(fluoroalkyl group) $SO_3^-$.

Among them, $BF_4^-$ is preferable, because it does not generate insoluble salts by reacting again with cations in the electrolyte solution.

The electrolyte compound is appropriately selected depending on the intended purpose without any limitation, but the electrolyte compound is a compound represented by the following general formula (1):

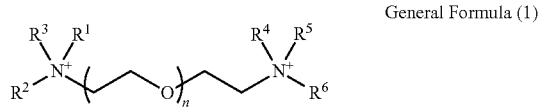

General Formula (1)

In the general formula (1) above, $R^1$, $R^2$, $R^3$, $R^4$, $R^5$, and $R^6$ are appropriately selected depending on the intended purpose without any limitation, and $R^1$, $R^2$, $R^3$, $R^4$, $R^5$, and $R^6$ is each any of a hydrogen atom, an alkyl group, an alkenyl group, an aryl group, or a heterocyclic group, and may be bonded to each other to form a ring structure.

Among them, a C1-C4 alkyl group is preferable, and a methyl group is more preferable, as the stability of the cations can be improved while maintaining the molecular weight small.

The repeating number of the ethylene oxide represented by "n" is appropriately selected depending on the intended purpose without any limitation, provided that n represents an integer of 1 to 10, but it is preferably 1 to 8, more preferably 1 to 3.

As the larger the number of the repeating units is, less influence of the quaternary ammonium cation to the molecular weight there is. On the other hand, the smaller the number of the repeating units is, more influence of the quaternary ammonium cation to the molecular weight there is.

When the number of the repeating units is greater than 10, the properties obtained are close to that of the polyethylene glycol chain, even though quaternary ammonium cations are incorporated at the both terminals, which is not suitable as an electrolyte. Moreover, a device using the resulting electrolyte solution may not maintain the internal resistance and the electrostatic capacitance within the preferable ranges after a load test. When the number of the repeating units in within the aforementioned even more preferable range, it is advantages in view of internal resistance and electrostatic capacitance after the load test.

The compound represented by the general formula (1) is appropriately selected depending on the intended purpose without any limitation, but the compound represented by the general formula (1) is preferably the compound represented by the following structural formula (1):

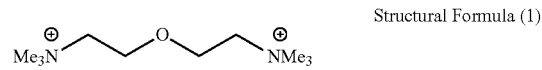

Structural Formula (1)

In the structural formula (1) above, Me is a methyl group.

A concentration of the electrolyte compound in the electrolyte solution is appropriately selected depending on the intended purpose without any limitation, but the concentration thereof is preferably 0.1 mol/L to 10 mol/L, more preferably 1 mol/L to 3 mol/L.

When the concentration thereof is lower than 0.1 mol/L, the number of ions acting as carrier is small because of low concentration, which may lead to poor electrical conduction property. When the concentration thereof is higher than 10 mol/L, the higher concentration gives better effect, but the effect may be saturated at 10 mol/L. When the concentration thereof is within the aforementioned more preferable range, it is advantageous because the maximum effect can be exhibited with respect to the weight of the electrolyte.

<Organic Solvent>

The organic solvent is appropriately selected depending on the intended purpose without any limitation, and examples thereof include propylene carbonate, ethylene carbonate, and dimethyl carbonate. These organic solvents may be used independently, or in combination.

Among them, propylene carbonate is preferable, because propylene carbonate has high dielectric constant, and is highly soluble to the electrolyte.

<Other Components>

Other components are is appropriately selected depending on the intended purpose without any limitation, and examples thereof include additives (e.g., a phosphazene-based compound) for preventing decomposition of a solvent or solute.

The disclosed electrolyte solution can be stably used over a long period of time, and can improve solubility and specific conductance of the electrolyte compound.

(Electric Energy Storing Device)

The disclosed electric energy storing device is appropriately selected depending on the intended purpose without any limitation, provided that the electric energy storing device contains the disclosed electrolyte solution, and examples thereof include an electric double-layer capacitor.

A shape of the electric double-layer capacitor is appropriately selected depending on the intended purpose without any limitation, and examples thereof include a coin-cell (a bottom-cell) shape, a flat cell shape, a cylinder-cell shape, and a coil-cell shape.

In FIG. 1, a coin-cell electric double-layer capacitor 100 is equipped with collectors 1, 2 by which an electrolyte solution is enclosed therein, the electrolyte solution 4 enclosed by the collectors 1, 2, and a separator 3 for separating the electrolyte solution 4, and is entirely covered with a cap (a lead electrode) (not illustrated). Specifically, the electrolyte solution 4 is separated and disposed in the manner that a surface of the separated part of the electrolyte solution opposite to the surface thereof facing the separator 2 is in contact with the collector 1 or 2.

—Collector—

A shape of the collector is appropriately selected depending on the intended purpose without any limitation, and examples thereof include a plate, a mesh, a foam metal, a perforated metal, and an expand metal.

A structure and size of the collector are appropriately selected depending on the intended purpose without any limitation.

A material of the collector is appropriately selected depending on the intended purpose without any limitation. For example, a material formed by plasma spraying or electric arc spraying nickel, aluminum, zinc, copper, tin, lead, titanium, stainless steel or an alloy thereof onto activated carbon fibers.

—Separator—

A configuration of the separator is appropriately selected depending on the intended purpose without any limitation, and examples thereof include a plate, a film, and a gel.

A structure and size of the separator are appropriately selected depending on the intended purpose without any limitation.

A material of the separator is appropriately selected depending on the intended purpose without any limitation, and examples thereof include glass filter paper, nonwoven fabric of polypropylene, or nylon, a porous film of polytetrafluoroethylene, a resin film, and a solid electrolyte.

—Cap (Lead Electrode)—

A shape, structure, and size of the cap (lead electrode) are appropriately selected depending on the intended purpose without any limitation.

A material of the cap (lead electrode) is appropriately selected depending on the intended purpose without any limitation, and examples thereof include conductive metals such as stainless steel, aluminum, and nickel.

The disclosed electrolyte solution and electric energy storing device will be more specifically explained through Examples, but these Examples shall not be construed as to limit the embodiments of the disclosed electrolyte solution and electric energy storing device in any way.

EXAMPLES

Example 1

As a starting material of polyethylene glycol represented by the general structural formula HO—$(CH_2$—$CH_2$—$O)_n$—$CH_2$—$CH_2$—OH, an electrolyte compound was synthesized through an organic reaction represented by Scheme 1 below. Scheme 1 depicts a typical example of polyethylene glycol, where n is 1. A length of a principle chain of the electrolyte compound is appropriately selected by appropriately selecting, in Scheme 1, the number of "n" of the polyethylene glycol serving as a staring material. Moreover, a type of the counter anion is appropriately selected by appropriately selecting a type of the acid added.

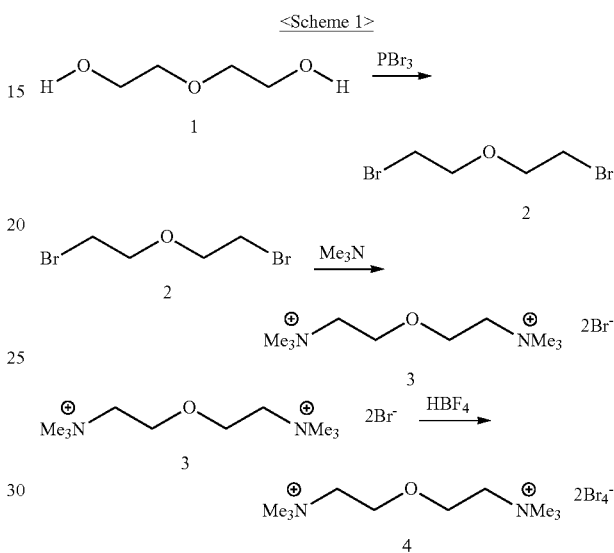

<Scheme 1>

In the Scheme 1, Me is a methyl group.

In the course of Scheme 1, 10.6 g (0.1 mol) of diethylene glycol (manufactured by Tokyo Chemical Industry Co., Ltd., 1 in Scheme 1) was dissolved in 50 mL of methylene chloride (manufactured by Kanto Chemical Co., Ltd.) in a nitrogen atmosphere, followed by cooling the resulting solution to 0° C. After cooling, 54.1 g (0.2 mol) of phosphorus tribromide (manufactured by Kanto Chemical Co., Ltd.) was added to the solution dropwise over the period of 30 minutes, followed by stirring for 24 hours. After stirring, the temperature of the solution was returned to room temperature, and the solution was washed with a saturated aqueous solution of sodium hydrogen carbonate. After washing, the solvent was removed to thereby yield 23 g of a dibromo product (2 in Scheme 1) (yield: 99%). The obtained dibromo product was subjected to the measurement of HNMR using $CDCl_3$, a peak derived from Br—$CH_2$— was observed at σ3.47 (t), and a peak derived from —$CH_2$—O— was observed at σ3.87 ppm (t) (see *Journal of the Chemical Society*, Perkin Transactions 1: (4), 707-15; 1983).

The obtained dibromo product (23 g) (0.1 mol) was dissolved in acetonitrile (50 mL, manufactured by Kanto Chemical Co., Ltd.), and to the resulting solution, 147 g (0.25 mol) of trimethyl amine (manufactured by Sigma-Aldrich Japan) over the period of 30 minutes at room temperature, followed by stirring for 24 hours. After stirring, 100 mL of isopropanol (manufactured by Kanto Chemical Co., Ltd.) was added to the solution, and the resulting solution was condensed to 20 mL by means of a rotary evaporator. The precipitate obtained by the condensation was separated by filtration. After washing the obtained precipitate with a trace of cooled ethanol, the resultant was vacuum dried for 3 hours under the reduced pressure of 1 mmHg, to thereby yield 10 g of bromide of bivalent quaternary ammonium (3 in Scheme 1) (yield: 57%).

Note that, instead of trimethyl amine, arbitral trialkyl amine may be added to yield bromide of bivalent quaternary ammonium (see *Chemical Papers*, 41(6), 803-14; 1987).

The obtained bromide of bivalent quaternary ammonium (3 in Scheme 1) was dissolved in water, and to the resulting solution, an excessive amount of fluoroboric acid (manufactured by Wako Pure Chemical Industries, Ltd.) was added, to thereby obtain bivalent quaternary ammonium salt containing $BF_4^-$ (4 in Scheme 1) as a counter anion.

As a result of an elementary analysis of the obtained bivalent quaternary ammonium salt (4 in Scheme 1), a content ratio of carbon, hydrogen, and nitrogen was 10:26:2 (atomic ratio).

Figure 2:
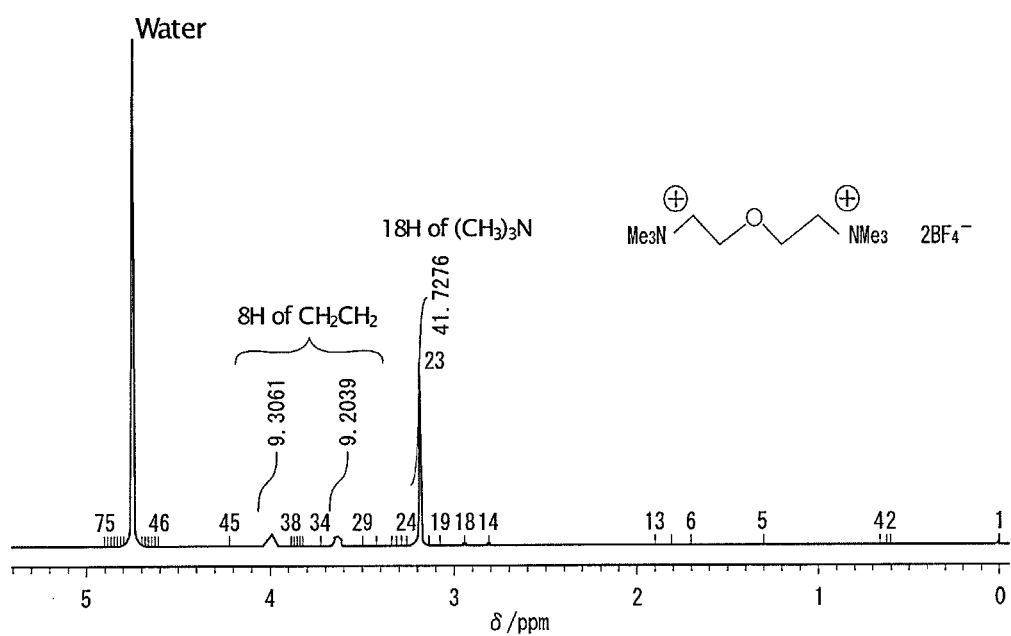
FIG. 2 is a diagram depicting the results of NMR analysis of the electrolyte compound obtained in Example 1.

The obtained bivalent quaternary ammonium salt (4 in Scheme 1) was subjected to NMR analysis. The result was presented in FIG. 2.

An electrolyte solution whose concentration of the electrolyte compound was 1 mol/L was prepared using the bivalent quaternary ammonium salt containing $BF_4^-$ as a counter anion, and propylene carbonate (manufactured by Kishida Chemical Co., Ltd.) as an organic solvent.

A coin-cell electric double-layer capacitor prepared in the manner described below was charged with the above-prepared electrolyte solution. The capacitor charged with the electrolyte solution was subjected to a charge and discharge test of 3V for 1,000 times at 25° C. by means of a charge and discharge evaluation tester (TOSCAT3100, manufactured by Toyo System Co., Ltd.), to thereby measure internal resistance and electrostatic capacitance of the prepared capacitor before and after the load test. The result is presented in Table 1.

<Preparation of Coin-Cell Electric Double-Layer Capacitor>

In a coin-cell case of CR2032, a separator was disposed between two electrodes. The case was charged with the above-prepared electrolyte solution, and was crimped to thereby produce a coin-cell electric double-layer capacitor.

<Measurement of Internal Resistance>

Upon setting the charge and discharge tester to an internal resistance measuring mode, the internal resistance was measured by applying voltage and measuring a current value.

<Measurement of Electrostatic Capacitance>

By means of the charge and discharge tester, the electrostatic capacitance was calculated using the following formula.

$$C = I \times (T2-T1)/(V1-V2)$$

C: electrostatic capacitance
V1: a value at which the charging voltage is 80%
V2: a value at which the charging voltage is 40%
T1: time retaining at V1
T2: time retaining at V2
I: a quantity of electric discharge Example 2

An electrolyte compound was synthesized, an electrolyte solution was prepared using the electrolyte compound, a coin-cell electric double-layer capacitor was produced using the electrolyte solution, and internal resistance and electrostatic capacitance before and after a load test were measured in the same manner as in Example 1, provided that 10.6 g (0.1 mol) of diethylene glycol (manufactured by Tokyo Chemical Industry Co., Ltd.) used as the starting material was replaced with 15 g (0.1 mol) of polyethylene glycol (triethylene glycol) (manufactured by Tokyo Chemical Industry Co., Ltd.) represented by the structural formula $HO-(CH_2-CH_2-O)_2-CH_2-CH_2-OH$. The results are presented in Table 1.

As a result of an elementary analysis of the obtained bivalent quaternary ammonium salt, a content ratio of carbon, hydrogen, and nitrogen was 12:30:2 (atomic ratio).

Example 3

An electrolyte compound was synthesized, an electrolyte solution was prepared using the electrolyte compound, a coin-cell electric double-layer capacitor was produced using the electrolyte solution, and internal resistance and electrostatic capacitance before and after a load test were measured in the same manner as in Example 1, provided that 10.6 g (0.1 mol) of diethylene glycol (manufactured by Tokyo Chemical Industry Co., Ltd.) used as the starting material was replaced with 19 g (0.1 mol) of polyethylene glycol (tetraethylene glycol) (manufactured by Tokyo Chemical Industry Co., Ltd.) represented by the structural formula: $HO-(CH_2-CH_2-O)_3-CH_2-CH_2-OH$. The results are presented in Table 1.

As a result of an elementary analysis of the obtained bivalent quaternary ammonium salt, a content ratio of carbon, hydrogen, and nitrogen was 14:34:2 (atomic ratio).

Example 4

An electrolyte compound was synthesized, an electrolyte solution was prepared using the electrolyte compound, a coin-cell electric double-layer capacitor was produced using the electrolyte solution, and internal resistance and electrostatic capacitance before and after a load test were measured in the same manner as in Example 1, provided that 10.6 g (0.1 mol) of diethylene glycol (manufactured by Tokyo Chemical Industry Co., Ltd.) used as the starting material was replaced with 31 g (0.1 mol) of polyethylene glycol (manufactured by Tokyo Chemical Industry Co., Ltd.) represented by the structural formula: $HO-(CH_2-CH_2-O)_6-CH_2-CH_2-OH$. The results are presented in Table 1.

As a result of an elementary analysis of the obtained bivalent quaternary ammonium salt, a content ratio of carbon, hydrogen, and nitrogen was 20:46:2 (atomic ratio).

Example 5

An electrolyte compound was synthesized, an electrolyte solution was prepared using the electrolyte compound, a, coin-cell electric double-layer capacitor was produced using the electrolyte solution, and internal resistance and electrostatic capacitance before and after a load test were measured in the same manner as in Example 1, provided that 10.6 g (0.1 mol) of diethylene glycol (manufactured by Tokyo Chemical Industry Co., Ltd.) used as the starting material was replaced with 50 g (0.1 mol) of polyethylene glycol (manufactured by Dojindo Laboratories) represented by the structural formula: $HO-(CH_2-CH_2-O)_{10}-CH_2-CH_2-OH$. The results are presented in Table 1.

As a result of an elementary analysis of the obtained bivalent quaternary ammonium salt, a content ratio of carbon, hydrogen, and nitrogen was 28:62:2 (atomic ratio).

Example 6

An electrolyte compound was synthesized, an electrolyte solution was prepared using the electrolyte compound, a coin-cell electric double-layer capacitor was produced using the electrolyte solution, and internal resistance and electrostatic capacitance before and after a load test were measured in the same manner as in Example 1, provided that 10.6 g (0.1 mol) of diethylene glycol (manufactured by Tokyo Chemical Industry Co., Ltd.) used as the starting material was replaced with 55 g (0.1 mol) of polyethylene glycol (manufactured by Dojindo Laboratories) represented by the structural formula: $HO-(CH_2-CH_2-O)_{11}-CH_2-CH_2-OH$. The results are presented in Table 1.

As a result of an elementary analysis of the obtained bivalent quaternary ammonium salt, a content ratio of carbon, hydrogen, and nitrogen was 30:66:2 (atomic ratio).

Example 7

An electrolyte solution was prepared using the electrolyte compound, a coin-cell electric double-layer capacitor was produced using the electrolyte solution, and internal resistance and electrostatic capacitance before and after a load test were measured in the same manner as in Example 3, provided that instead of preparing the electrolyte solution whose concentration of the electrolyte compound was 1 mol/L, an electrolyte solution whose concentration of the electrolyte compound was 2 mol/L was prepared. The results are presented in Table 1.

Comparative Example 1

An electrolyte solution was prepared using an electrolyte compound, a coin-cell electric double-layer capacitor was produced using the electrolyte solution, and internal resistance and electrostatic capacitance before and after a load test were measured in the same manner as in Example 1, provided that the bivalent quaternary ammonium salt (4 in Scheme 1) used as the electrolyte compound was replaced with $(C_2H_5)_4N \cdot BF_4$ (manufactured by Tokyo Chemical Industry Co., Ltd.). The results are presented in Table 1.

Comparative Example 2

An electrolyte compound was synthesized, an electrolyte solution was prepared using the electrolyte compound, a coin-cell electric double-layer capacitor was produced using the electrolyte solution, and internal resistance and electrostatic capacitance before and after a load test were measured in the same manner as in Example 1, provided that the obtained bivalent quaternary ammonium salt (4 in Scheme 1) used as the electrolyte compound was replaced with a bivalent quaternary ammonium salt represented by 102 in Scheme 2 below. The results are presented in Table 1.

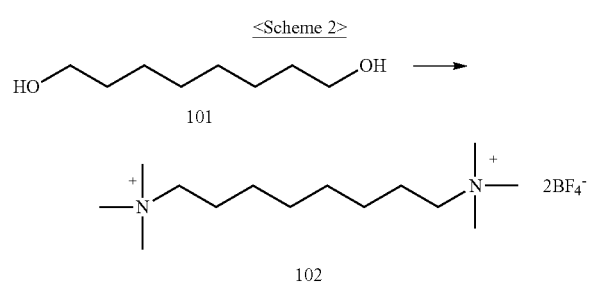

As the compound represented by 101 in Scheme 2, 14.6 g (0.1 mol) of 1,8-octanediol (manufactured by Tokyo Chemical Industry Co., Ltd.) was used to synthesize bivalent quaternary ammonium salt represented by 102 in Scheme 2.

As a result of an elementary analysis of the bivalent quaternary ammonium salt represented by 102 in Scheme 2, the content ratio of carbon, hydrogen, nitrogen was 14:34:2 (atomic ratio).

TABLE 1

| | Electrolyte | Concentration of electrolyte solution (mol/L) | Before load test Internal resistance (Ω) | After load test Internal resistance (Ω) | Internal resistance Increased amount (Ω) | Before load test Electrostatic capacitance (F/mL) | After load test Electrostatic capacitance (F/mL) | Electrostatic capacitance Increased amount (F/mL) |
|---|---|---|---|---|---|---|---|---|
| Comp. Ex. 1 | $(C_2H_5)_4N \cdot BF_4$ | 1 | 20 | 50 | 30 | 30 | 14.5 | −15.5 |
| Comp. Ex. 2 | 102 in Scheme 2 | 1 | 30 | 55 | 25 | 20 | 12.0 | −8.0 |
| Ex. 1 | Chemical formula 1 (n = 1) | 1 | 26 | 36 | 10 | 29 | 16.5 | −12.5 |
| Ex. 2 | Chemical formula 1 (n = 2) | 1 | 26 | 37 | 11 | 29 | 16.4 | −12.6 |
| Ex. 3 | Chemical formula 1 (n = 3) | 1 | 27 | 36 | 9 | 26 | 16.3 | −9.7 |
| Ex. 4 | Chemical formula 1 (n = 6) | 1 | 28 | 40 | 12 | 24 | 15.1 | −8.9 |
| Ex. 5 | Chemical formula 1 (n = 10) | 1 | 30 | 46 | 16 | 22 | 14.8 | −7.2 |
| Ex. 6 | Chemical formula 1 (n = 11) | 1 | 32 | 49 | 17 | 21 | 14.5 | −6.5 |
| Ex. 7 | Chemical formula 1 (n = 3) | 2 | 20 | 30 | 10 | 31 | 20 | −11.0 |

It was found from Table 1 that the electric double-layer capacitors of Examples 1 to 7 had lower internal resistance after the load test, compared to that of Comparative Example 1. This is probably because the voltage endurance characteristics of the electrolyte compound was improved in the capacitors using the electrolyte solutions of Examples 1 to 7. Further, the electric double-layer capacitors of Examples 1 to 7 had desirable results in the electrostatic capacitance after the load test.

Especially, Examples 1 to 5 in which the compound represented by the general formula (1) where n was 1 to 10 was used had more desirable results of internal resistance and electrostatic capacitance after the load test compared to that of Example 6 in which the compound represented by the general formula (1) where "n" was 11 was used. Accordingly, it was found that the value of "n" in the general formula (1) was preferably in the range of 1 to 10.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the sprit and scope of the invention.

The invention claimed is:

1. An electrolyte solution, comprising:
   an electrolyte compound, a molecular structure of which contains a molecular chain containing a repeating unit of alkylene oxide, and contains quaternary ammonium cations at both terminals of the molecular chain.

2. The electrolyte solution according to claim 1, wherein the alkylene oxide is at least one selected from the group consisting of methylene oxide, ethylene oxide, and propylene oxide.

3. The electrolyte solution according to claim 1, wherein the electrolyte compound is represented by the following general formula (I):

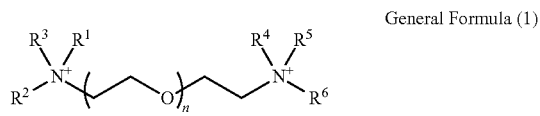

General Formula (1)

where $R^1$, $R^2$, $R^3$, $R^4$, $R^5$, and $R^6$ is each any of a hydrogen atom, an alkyl group, an alkenyl group, an aryl group, or a heterocyclic group, and may be bonded to each other to form a ring structure; and n represents a repeating number of ethylene oxide, and is an integer of 1 to 10.

4. The electrolyte solution according to claim 3, wherein the quaternary ammonium cations are trimethyl ammonium cations.

5. The electrolyte solution according to claim 3, wherein the electrolyte compound contains a counter anion with respect to the quaternary ammonium cation, the counter anion containing at least one selected from the group consisting of a halogen anion, $BF_4^-$, $PF_6^-$, $ClO_4^-$, $AsF_6^-$, $SbF_6^-$, $AlCl_4^-$, and $RfSO_3^-$ where Rf is a fluoroalkyl group.

6. The electrolyte solution according to claim 3, wherein the electrolyte compound contains a counter anion with respect to the quaternary ammonium cation, and the counter anion is $BF_4^-$.

7. The electrolyte solution according to claim 1, wherein a number of the repeating units of the alkylene oxide contained in the molecular chain of the electrolyte compound is 1 to 10.

8. The electrolyte solution according to claim 1, wherein the quaternary ammonium cations are trimethyl ammonium cations.

9. The electrolyte solution according to claim 1, wherein the electrolyte compound contains a counter anion with respect to the quaternary ammonium cation, the counter anion containing at least one selected from the group consisting of a halogen anion, $BF_4^-$, $PF_6^-$, $ClO_4^-$, $AsF_6^-$, $SbF_6^-$, $AlCl_4^-$, and $RfSO_3^-$ where Rf is a fluoroalkyl group.

10. The electrolyte solution according to claim 1, wherein the electrolyte compound contains a counter anion with respect to the quaternary ammonium cation, and the counter anion is $BF_4^-$.

11. The electrolyte solution according to claim 1, further comprising an organic solvent.

12. A use of an electrolyte solution, comprising:
    charging a case with the electrolyte solution as defined in claim 1 to thereby prepare an electric energy storing device.

13. An electric energy storing device, comprising:
    an electrolyte solution; and
    a collector,
    wherein the electrolyte solution contains:
    an electrolyte compound a molecular structure of which contains a molecular chain containing a repeating unit of alkylene oxide, and contains quaternary ammonium cations at both terminals of the molecular chain.

14. The electric energy storing device according to claim 13, wherein the electric energy storing device is a coin-cell electric energy storing device.

15. The electric energy storing device according to claim 13, wherein the alkylene oxide is at least one selected from the group consisting of methylene oxide, ethylene oxide, and propylene oxide.

16. The electric energy storing device according to claim 13, wherein the electrolyte compound is represented by the following general formula (1):

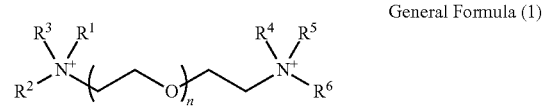

General Formula (1)

where $R^1$, $R^2$, $R^3$, $R^4$, $R^5$, and $R^6$ is each any of a hydrogen atom, an alkyl group, an alkenyl group, an aryl group, or a heterocyclic group, and may be bonded to each other to form a ring structure; and n represents a repeating number of ethylene oxide, and is an integer of 1 to 10.

17. The electric energy storing device according to claim 16, wherein the quaternary ammonium cations are trimethyl ammonium cations.

18. The electric energy storing device according to claim 16, wherein the electrolyte compound contains a counter anion with respect to the quaternary ammonium cation, and the counter anion is $BF_4^-$.

19. The electric energy storing device according to claim 13, wherein the quaternary ammonium cations are trimethyl ammonium cations.

20. The electric energy storing device according to claim 13, wherein the electrolyte compound contains a counter anion with respect to the quaternary ammonium cation, and the counter anion is $BF_4^-$.

* * * * *